United States Patent
Hyuga et al.

(10) Patent No.: US 7,459,114 B2
(45) Date of Patent: Dec. 2, 2008

(54) METHOD FOR MANUFACTURING IN-MOLD COATING PRODUCT

(75) Inventors: Hiromi Hyuga, Aichi-ken (JP); Koichi Ueno, Aichi-ken (JP); Nobuyoshi Baba, Aichi-ken (JP); Daiichiro Kawashima, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 625 days.

(21) Appl. No.: 10/999,193

(22) Filed: Nov. 30, 2004

(65) Prior Publication Data
US 2005/0116384 A1    Jun. 2, 2005

(30) Foreign Application Priority Data
Dec. 2, 2003    (JP) .............................. 2003-403760

(51) Int. Cl.
  *B29C 45/14*    (2006.01)
  *B29C 45/16*    (2006.01)
(52) U.S. Cl. .................... 264/255; 264/296; 264/328.7; 264/328.8; 264/320
(58) Field of Classification Search ........................ None
  See application file for complete search history.

(56) References Cited
U.S. PATENT DOCUMENTS

| | | | | |
|---|---|---|---|---|
| 4,389,358 A | * | 6/1983 | Hendry | ...................... 264/45.1 |
| 4,668,460 A | | 5/1987 | Ongena | |
| 5,026,265 A | * | 6/1991 | Kanai et al. | .................. 425/127 |
| 5,160,474 A | * | 11/1992 | Huff | ........................... 264/255 |
| 6,143,231 A | * | 11/2000 | DiSimone | ................... 264/313 |
| 6,579,487 B1 | * | 6/2003 | Lichtinger | ................... 264/255 |
| 2003/0197307 A1 | | 10/2003 | Kitamura et al. | |

FOREIGN PATENT DOCUMENTS

| | | |
|---|---|---|
| JP | A-55-118845 | 9/1980 |
| JP | A-61-273921 | 12/1986 |
| JP | A-08-072096 | 3/1996 |
| JP | A-2003-191286 | 7/2003 |
| JP | A-2003-334838 | 11/2003 |

OTHER PUBLICATIONS

Office Action dated Feb. 5, 2008 in corresponding Japanese Patent Application No. 2003-403760.

* cited by examiner

*Primary Examiner*—Edmund H. Lee
(74) *Attorney, Agent, or Firm*—Posz Law Group, PLC

(57) ABSTRACT

A method for molding an in-mold coating product including a substrate and a coating formed on a surface of the substrate. A first mold including a fixed mold piece is closed to form a substrate cavity therein. The substrate cavity is charged with a resin to form the substrate with a seal projection formed near the parting line of the first mold. Then, a second mold, which uses the fixed mold piece of the first mold, is closed with the substrate arranged on the fixed mold piece to form a coating cavity therein. The second mold deforms the seal projection so that when a coating material is charged into the coating cavity, the coating material does not leak out toward the parting line of the second mold.

6 Claims, 5 Drawing Sheets

METHOD FOR MANUFACTURING IN-MOLD COATING PRODUCT

CROSS-REFERENCE TO RELATED APPLICATIONS

This application is based upon and claims the benefit of priority from prior Japanese Patent Application No. 2003-403760, filed on Dec. 2, 2003, the entire contents of which are incorporated herein by reference.

BACKGROUND OF THE INVENTION

The present invention relates to a method for manufacturing an in-mold coating product that easily improves the hermetic seal for a mold having an in-mold coating cavity.

A resin molding product, such as a door pillar garnish for an automobile, is typically manufactured by performing in-mold coating in which a substrate is first molded and a coating is then applied to the substrate. When charging a mold cavity with a coating material, which has a low viscosity, to apply the coating material to the substrate during in-mold coating, there is a tendency for the coating material to leak out of the mold cavity. Therefore, an auxiliary cavity extends around the entire mold cavity. Resin is charged into the auxiliary cavity so that the molded substrate is provided with a structure for preventing the leakage of the coating material. However, as the resin in the auxiliary cavity cools during the period from when the substrate is molded to when the coating material is charged, a gap is formed between the mold and the resin in the auxiliary cavity. As a result, the coating material may leak out of the gap.

Referring to FIG. 8A, to solve this problem, resin is charged into a substrate cavity, which is defined between a movable mold piece 101 and a fixed mold piece 102, to mold a substrate 103 in the prior art. The molded substrate 103 includes a projection 103a. Then, referring to FIG. 8B, the movable mold piece 101 is moved in a mold opening direction to form a coating cavity 104 into which a coating material is charged. The projection 103a closes the gap between the substrate 103 and the movable mold piece 101 to prevent leakage of the coating material.

Japanese Laid-Open Patent Publication No. 2003-191286 describes a groove formed in an auxiliary cavity of a movable mold piece. Subsequent to the molding of the substrate, the movable mold piece is moved in a mold opening direction to form a coating cavity into which a coating material is charged between the surface of the substrate and the cavity surface of the movable mold piece. When moving the movable mold piece in the mold opening direction, the projection of the substrate moves out of the groove and closes the gap between the substrate and the mold piece. This prevents the charged coating material from leaking out of the coating cavity.

However, in the mold of FIGS. 8A and 8B and the mold of Japanese Laid-Open Patent Publication No. 2003-191286, the same mold pieces are used to mold the substrate and to apply the coating. This results in the necessity of the auxiliary cavity, which imposes many restrictions on the shape of the resin molded product, especially, at the peripheral portion of the product.

SUMMARY OF THE INVENTION

Accordingly, it is an object of the present invention to provide a method for manufacturing an in-mold coating product that improves the hermetic seal for a mold having an in-mold coating cavity.

One aspect of the present invention is a method for molding an in-mold coating product including a substrate and a coating formed on a surface of the substrate. The method includes closing a first mold including a fixed mold piece and a first movable mold piece to form a substrate cavity between the fixed mold piece and the first movable mold piece, charging the substrate cavity with a resin to form the substrate with a seal projection formed near a parting line where the fixed mold piece and the first movable mold piece meet when the first mold is closed, closing a second mold including the fixed mold piece and a second movable mold piece in a state in which the substrate is arranged on the fixed mold piece to form a coating cavity between the surface of the substrate and the second movable mold piece, deforming part of the seal projection with the second movable mold piece, and charging the coating cavity with a coating material to form the coating on the surface of the substrate.

Another aspect of the present invention is a mold for molding an in-mold coating product including a substrate and a coating formed on a surface of the substrate. The mold is provided with a first mold including a fixed mold piece and a first movable mold piece. The first mold is closed to form a substrate cavity for forming the substrate between the fixed mold piece and the first movable mold piece. The first movable mold piece has a first cavity surface shaped in correspondence with the surface of the substrate. The first cavity surface includes a seal projection formation recess for forming a seal projection on the substrate near a parting line where the first mold piece and the first movable mold piece meet when the first mold is closed. The mold is further provided with a second mold including the fixed mold piece and a second movable mold piece. The second mold is closed to form a coating cavity between the fixed mold piece and the second movable mold piece. The second movable mold piece has a second cavity surface shaped in accordance with a surface of the in-mold coating product. The second cavity surface includes a coating formation portion, for forming the coating, and a seal projection deformation portion, located near a parting line where the fixed mold piece and the second movable mold piece meet when the second mold is closed. The seal projection deformation portion is located closer to the parting line than the seal projection formation recess of the first cavity surface in the first movable mold piece.

A further aspect of the present invention is an in-mold coating product including a substrate and a coating formed on a surface of the substrate. The substrate includes a first lip, formed on a side of the substrate contacting the coating, and a second lip, formed continuously from the first lip without contacting the coating.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment of the present invention applied to a door pillar garnish 20 for an automobile will now be described with reference to FIGS. 1 to 5.

Figure 1:
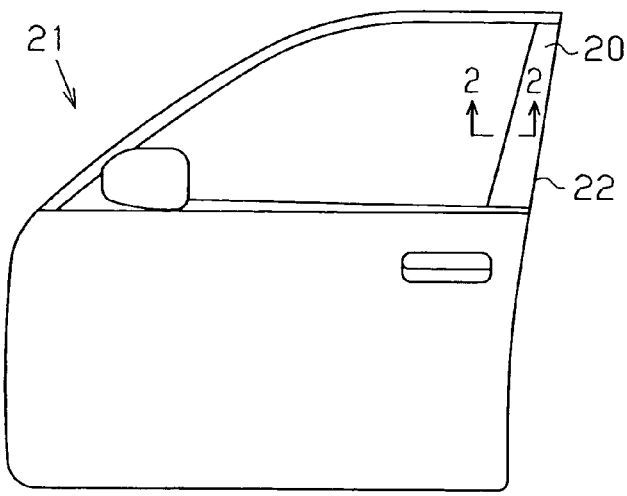
FIG. 1 is a side view showing a door to which a door pillar garnish according to a preferred embodiment of the present invention is attached.

Referring to FIG. 1, a door pillar garnish 20, which serves as an in-mold coating product of the preferred embodiment, is attached to a door pillar 22 of a side door 21 for an automobile. The door pillar garnish 20 covers the entire outer side of the door pillar 22. FIG. 1 is a view taken from the outer side of the side door 21.

Figure 2:
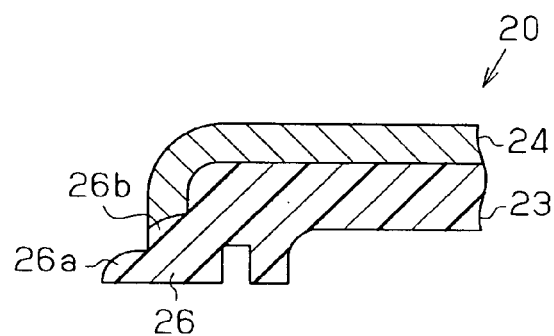
FIG. 2 is an enlarged cross-sectional view taken along line 2-2 in FIG. 1.

Referring to FIG. 2, the door pillar garnish 20 includes a substrate 23 and a coating 24. The substrate 23 is made of a thermoplastic resin, such as a thermoplastic acrylic resin, a thermoplastic polycarbonate resin, and a thermoplastic urethane resin. The coating 24 is a thin layer of a thermosetting acrylic resin applied to the surface of the substrate 23 and defines an ornamental surface of the door pillar garnish 20. The coating 24 has a thickness that is preferably from 0.05 mm to 0.30 mm, and more preferably 0.10 mm to 0.20 mm.

A seal 26 is formed on the side of the substrate 23. The seal 26 has a distal portion, which defines a first lip 26a, and a basal portion, which defines a second lip 26b next to the first lip 26a. The first lip 26a is thinner than the second lip 26b. A step is formed between the first and second lips 26a and 26b. An end surface of the coating 24 contacts the upper surface of the second lip 26b, as viewed in FIG. 2. In other words, the seal 26 is arranged at the boundary between the substrate 23 and the coating 24 at the side of the substrate 23.

A method for manufacturing the door pillar garnish 20 will now be discussed with reference to FIGS. 3 to 5.

A first mold 30 and a second mold 31 are used to manufacture the door pillar garnish 20.

Figure 3:
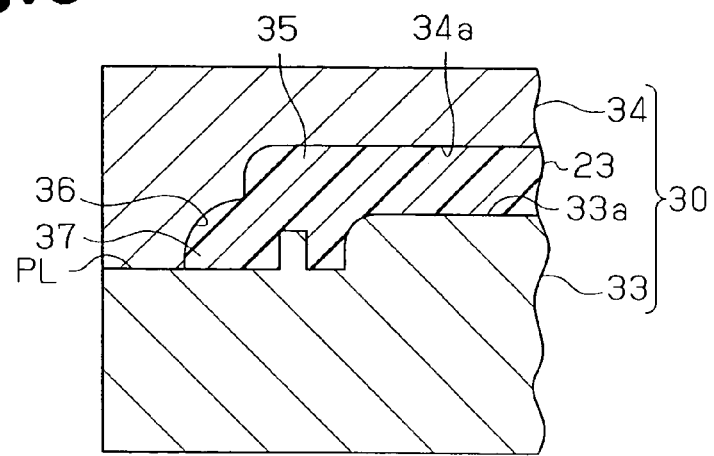
FIG. 3 is a partial cross-sectional view of a molded substrate.

Referring to FIG. 3, the first mold 30 includes a fixed mold piece 33 and a first movable mold piece 34. The first movable mold piece 34 is moved in the vertical direction to close and form a substrate cavity 35 in the first mold 30. The fixed mold piece 33 has a fixed mold cavity surface 33a shaped in correspondence with the lower surface (rear surface) of the substrate 23, as viewed in FIG. 3. The surfaces of the fixed mold piece 33 and the first movable mold piece 34 where the two mold pieces 33 and 34 meet when the first mold 30 is closed define a parting line PL of the first mold 30. The fixed mold cavity surface 33a is defined along a surface extending from the parting line PL. The first movable mold piece 34 has a first cavity surface 34a shaped in correspondence with the upper surface (front surface) of the door pillar garnish 20. The first cavity surface 34a is defined along a surface extending from the parting line PL.

A seal projection formation recess 36 is formed in the peripheral portion of the first cavity surface 34a to mold a seal projection 37. The second mold 31 squeezes the seal projection 37, which extends along the side of the substrate 23, into a predetermined shape to form the seal 26 with the first lip 26a and the second lip 26b. The inclination of the seal projection formation recess 36 relative to the parting line PL increases as the parting line PL becomes closer.

Figure 4A:
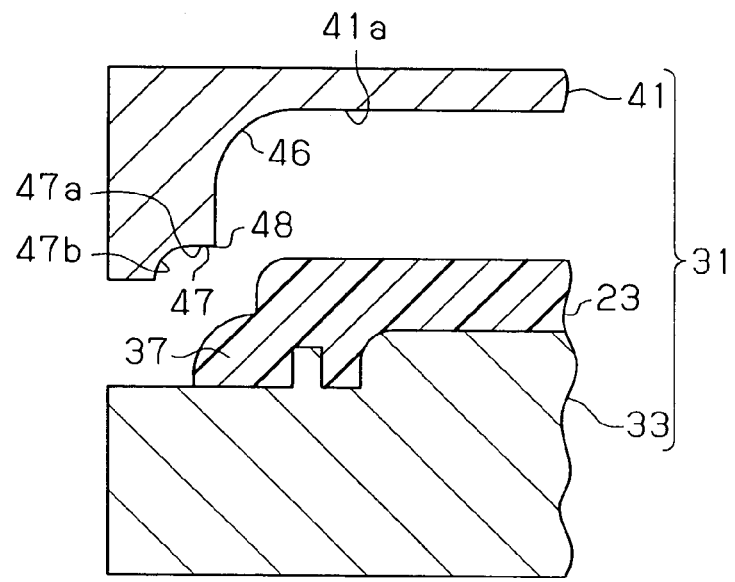
FIG. 4A is a partial cross-sectional view of a second mold in an open state during a second operation.
Figure 4B:
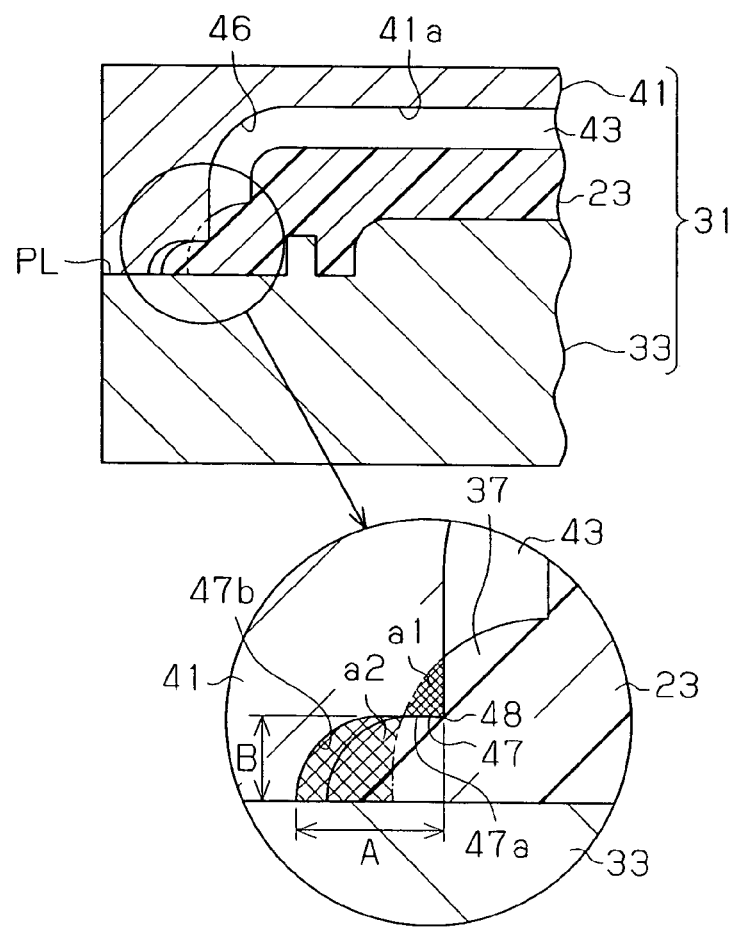
FIG. 4B is a partial cross-sectional view of the second mold in a closed state during the second operation.

Referring to FIGS. 4A and 4B, the first movable mold piece 34 is exchanged with a second movable mold piece 41 to form the second mold 31. In other words, the second mold 31 includes the fixed mold piece 33 and the second movable mold piece 41. The second movable mold piece 41 is moved in the vertical direction to close and form a coating cavity 43 in the second mold 31. The second movable mold piece 41 has a second cavity surface 41a shaped in correspondence with the door pillar garnish 20. The coating cavity 43 is defined between the substrate 23, which is adhered to the fixed mold piece 33, and the second cavity surface 41a. A coating material is charged into the coating cavity 43 to form the coating 24 on the surface of the substrate 23.

The surfaces of the fixed mold piece 33 and the second movable mold piece 41 where the two mold pieces 33 and 34 meet when the first mold 30 is closed define a parting line PL. The second cavity surface 41a of the second movable mold piece 41 includes a coating formation portion 46, which forms the coating 24, and a seal projection deformation portion 47, which extends from the parting line PL. The coating formation portion 46 is shaped in correspondence with the upper surface (front surface) of the coating 24. The seal projection deformation portion 47 is located at a position corresponding to the seal projection 37. Further, the seal projection deformation portion 47 is located closer to the parting line PL than the seal projection formation recess 36 in the first cavity surface 34a of the first movable mold piece 34. The seal projection deformation portion 47 deforms the seal projection 37, which is formed along the side of the substrate 23, into a predetermined shape.

The basal part of the seal projection deformation portion 47 defines a squeezer 47a. The squeezer 47a extends parallel to the parting line PL and is separated from the parting line PL by a predetermined distance in correspondence with the thickness of the first lip 26a. The distal part of the seal projection deformation portion 47 defines a deformation absorber 47b, which is located adjacent to the squeezer 47a and which has an inwardly curved cross-section. Further, a cornered edge 48 extends along the inner end of the squeezer 47a so that the seal projection 37 is easily squeezed.

Referring to FIG. 4B, the distance A from the edge 48 to the distal end of the deformation absorber 47b and the distance B from the edge 48 to the parting line is preferably 0.1 mm to 1.0 mm, further preferably 0.1 mm to 0.3 mm, and more preferably 0.1 mm to 0.15 mm. If the distance A is less than 0.1 mm, the coating cavity 43 cannot be sufficiently closed. On the other hand, if the distance A exceeds 1.0 mm, the thickness of the coating 24 at the side surface of the substrate 23 becomes insufficient. If the distance B is less than 0.1 mm, the deformation absorber 47b would not be large enough. On the other hand, if the distance B exceeds 1.0 mm, the thickness of the seal projection 37 must be significantly increased.

The door pillar garnish 20 is manufactured by performing a first operation, in which the first mold 30 is used to mold the substrate 23, and a second operation, in which the second mold 31 is used to form the coating 24 on the surface of the substrate 23.

Referring to FIG. 3, in the first operation, a thermoplastic resin is injected in a molten state from an injection gate (not shown) into the substrate cavity 35, which is defined between the fixed mold piece 33 and the first movable mold piece 34. This molds the substrate 23 with the seal projection 37 located next to the parting line PL. The seal projection 37 is formed so that its upper surface is more inclined in the downward direction at positions closer to the distal end of the seal projection 37, as viewed in FIG. 3.

The first movable mold piece 34 is then moved upward to open the first mold 30. The first movable mold piece 34 is exchanged with the second movable mold piece 41. Afterwards, the second operation is performed.

Referring to FIGS. 4A and 4B, in the second operation, the second movable mold piece 41 is engaged with the fixed mold piece 33 to close the second mold 31 with the substrate 23, which is molded in the first operation, held on the fixed mold piece 33. This forms the coating cavity 43 between the surface of the substrate 23 and the coating formation portion 46 of the second movable mold piece 41. In this state, the seal projection deformation portion 47 squeezes and deforms region a1 of the seal projection 37 where the seal projection deformation portion 47 overlaps the seal projection 37. It is preferred that region a1 have a height of 0.10 mm to 0.15 mm. The resin of the seal projection 37 in region a1 is deformed and squeezed out into region a2, which is defined between the deformation absorber 47b, the fixed mold piece 33, and the seal projection 37. In this case, it is preferred that region a1 be the same or smaller than region a2.

Figure 5:
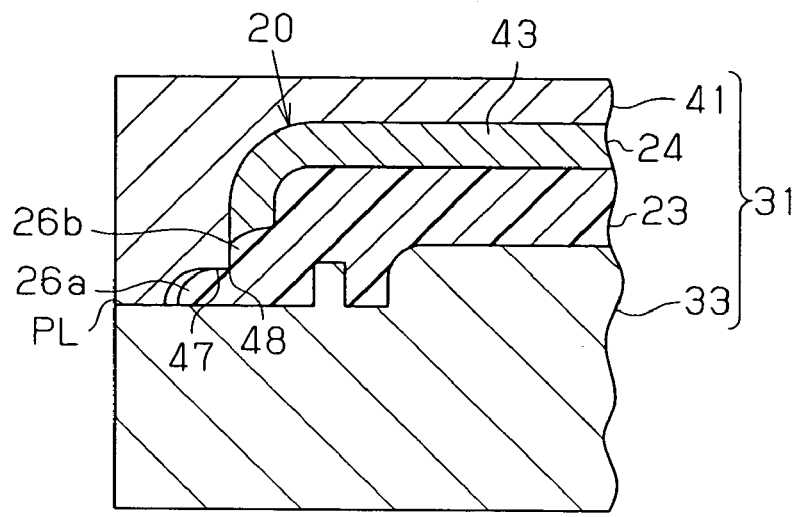
FIG. 5 is a partial cross-sectional view showing the formation of a coating during the second operation.

Then, referring to FIG. 5, a coating material, or thermosetting acrylic resin, is charged through a charging gate (not shown) into the coating cavity 43 and hardened to form the coating 24 on the surface of the substrate 23. In this state, the edge 48 of the seal projection deformation portion 47 bites into the upper side of the seal projection 37. Thus, the coating material does not leak out toward the parting line.

In this manner, the door pillar garnish 20 is molded by performing the second operation subsequent to the first operation. After the door pillar garnish 20 is molded, the second movable mold piece 41 is moved upward to open the second mold piece 31. Then, the door pillar garnish 20 is removed from the second mold 31. The first lip 26a at the side of the door pillar garnish 20 manufactured in this manner has a substantially uniform thickness. Further, since burrs are not formed on the first lip 26a, there is no need to remove burrs.

The preferred embodiment has the advantages described below.

The first mold 30, which molds the substrate 23, is separate from the second mold 31, which forms the coating 24 on the surface of the substrate 23. Thus, there is no need to provide an auxiliary cavity in the substrate cavity 35. This increases the level of freedom for the shape of the door pillar garnish 20. Additionally, since the second movable mold piece 41 squeezes and deforms the seal projection 37, the sealing capability of the seal projection 37 is increased. Thus, during the formation of the coating 24, the coating material does not leak out toward the parting line PL. Accordingly, burrs are not produced from the coating 24. This eliminates the need for removing burrs in a subsequent operation.

When the seal projection deformation portion 47 squeezes the upper surface of the seal projection 37, the deformed portion of the seal projection (the portion in region a1) is squeezed out and absorbed in region a2. Thus, the resin of the seal projection 37 is not squeezed out toward the parting line PL. Accordingly, there is no need for subsequently removing burrs. Additionally, the absorption of the deformed portion of the seal projection 37 suppresses deformation at the upper surface of the seal projection 37. This suppresses deformation at the end surface of the coating 24 near the seal projection 37 and improves the appearance at the boundary between the coating 24 and the substrate 23 of the door pillar garnish 20.

The squeezer 47a in the seal projection deformation portion 47 is provided with the edge 48, which easily bites into the seal projection 37. This improves the hermetic seal of the coating cavity 43.

The upper surface of the seal projection is more downwardly inclined as the distal end of the seal projection 37 becomes closer. Thus, when the seal projection deformation portion 47 squeezes the upper surface at the distal portion of the seal projection 37, the deformed portion (portion corresponding to region a1) is forced into the region a2.

It should be apparent to those skilled in the art that the present invention may be embodied in many other specific forms without departing from the spirit or scope of the invention. Particularly, it should be understood that the present invention may be embodied in the following forms.

Figure 6:
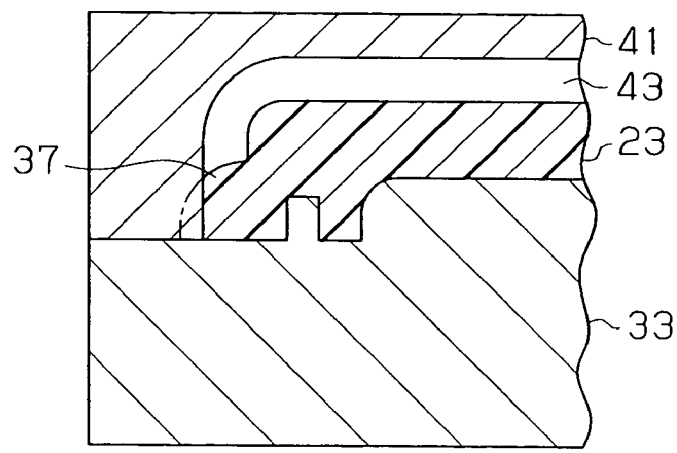
FIG. 6 is a partial cross-sectional view showing a mold according to another embodiment of the present invention.

Referring to FIG. 6, the deformation absorber 47b may be eliminated from the second movable mold piece 41. In this case, the resin of the seal projection 37 at the squeezed portion would be forced toward the parting line PL and thus form thin burrs. Thus, the burrs would have to be removed in a subsequent operation. However, the hermetic seal of the coating cavity 43 would still be improved like in the preferred embodiment.

Figure 7A:
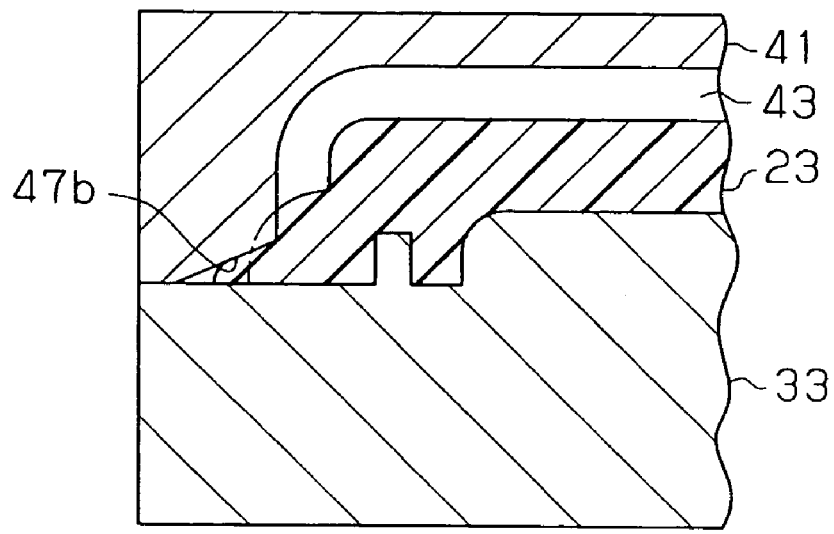
FIGS. 7A and 7B are cross-sectional views showing molds according to further embodiments of the present invention.

As shown in FIG. 7A, the deformation absorber 47b of the second movable mold piece 41 may have a triangular cross-section.

Figure 7B:
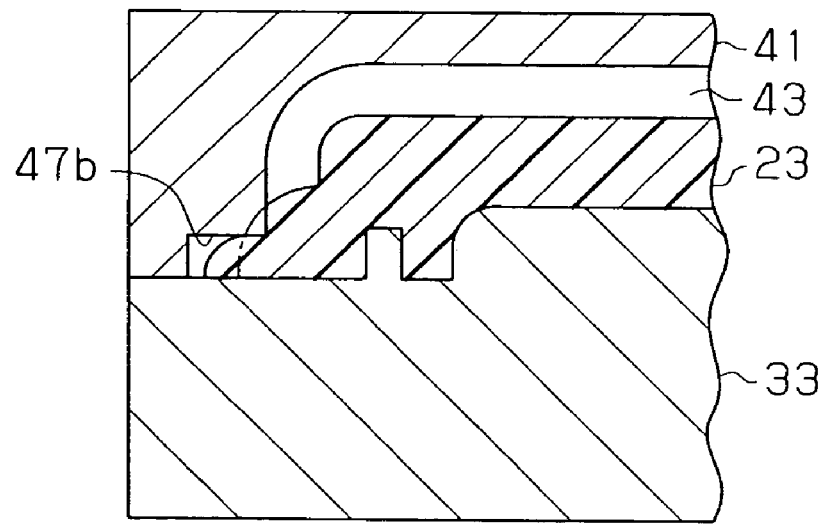
Figure 8A:
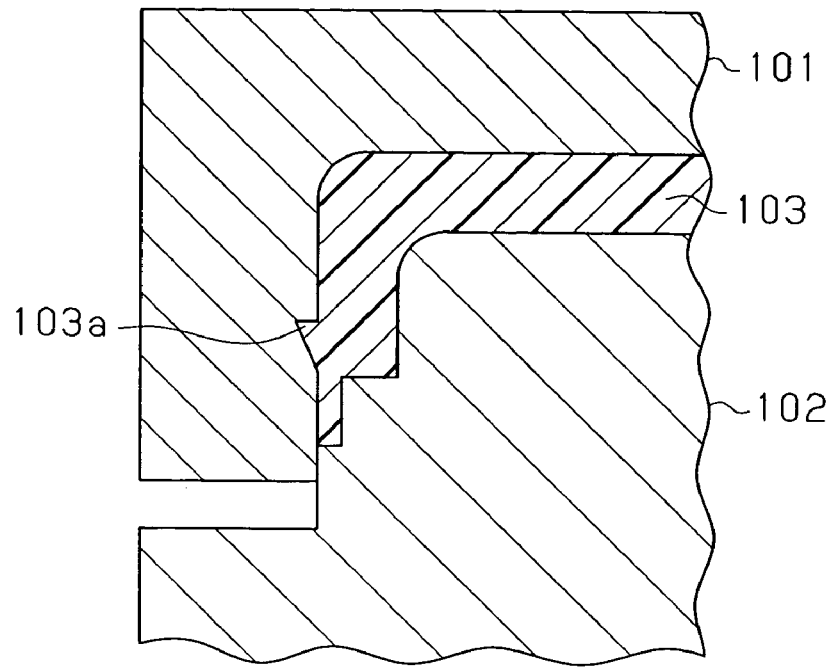
FIG. 8A is a partial cross-sectional view showing a molded substrate in the prior art.
Figure 8B:
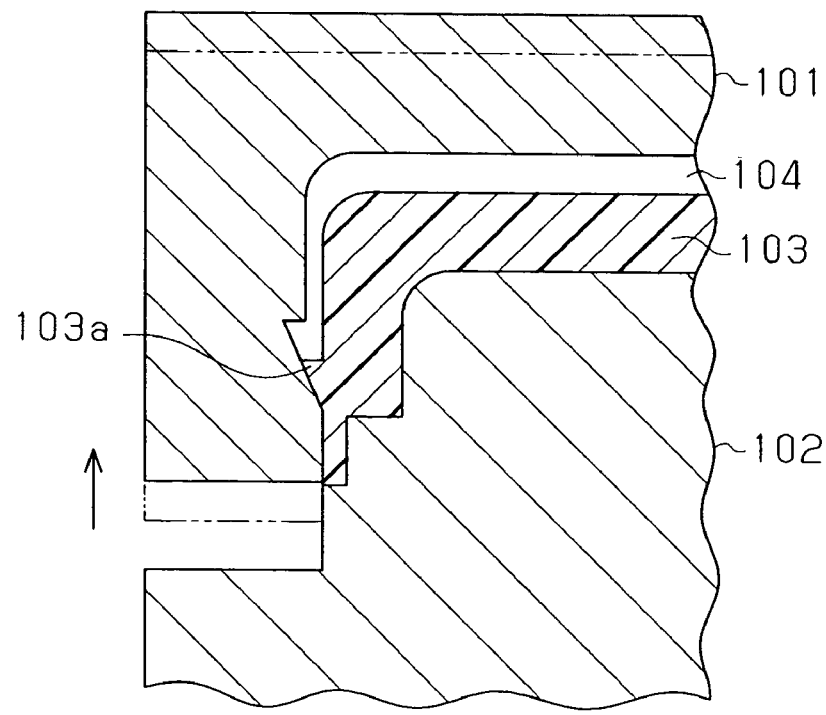
FIG. 8B is a partial cross-sectional view showing the molded substrate prior to the formation of a coating.

As shown in FIG. 7B, the deformation absorber 47b of the second movable mold piece 41 may have a rectangular cross-section.

The present examples and embodiments are to be considered as illustrative and not restrictive, and the invention is not to be limited to the details given herein, but may be modified within the scope and equivalence of the appended claims.

What is claimed is:

1. A method for molding an in-mold coating product including a substrate and a coating formed on a surface of the substrate, the method comprising:
   closing a first mold including a fixed mold piece and a first movable mold piece to form a substrate cavity between the fixed mold piece and the first movable mold piece;
   charging the substrate cavity with a resin to form the substrate with a seal projection;
   closing a second mold including the fixed mold piece and a second movable mold piece in a state in which the substrate is arranged on the fixed mold piece to form a coating cavity between the surface of the substrate and the second movable mold piece, wherein the second movable mold piece has a seal projection deformation portion including a squeezer and a deformation absorber;
   deforming part of the seal projection with the second movable mold piece by squeezing the seal projection with the squeezer and absorbing deformation produced in the seal projection by squeezing out part of the seal projection into a region defined between the deformation absorber, the fixed mold piece, and the seal projection; and
   charging the coating cavity with a coating material to form the coating on the surface of the substrate.

2. The method according to claim 1, wherein the region of the seal projection that is squeezed is smaller than the region defined between the deformation absorber, the fixed mold piece, and the seal projection.

3. The method according to claim 1, wherein the seal projection deformation portion of the second movable mold piece includes an edge, said deforming part of the seal projection.

4. The method according to claim 1, wherein the seal projection deformation portion of the second movable mold piece extends from a parting line where the fixed mold piece and the second movable mold piece meet when the second mold is closed.

5. The method according to claim 4, wherein the seal projection is formed at a position adjacent to the parting line.

6. The method according to claim 5, wherein the seal projection is more inclined towards the parting line.

* * * * *